US012499820B2

(12) United States Patent
Thielemans et al.

(10) Patent No.: US 12,499,820 B2
(45) Date of Patent: Dec. 16, 2025

(54) SYSTEMS AND METHODS FOR ALTERING LIGHT OUTPUT AND WHITE POINT OF A LIGHT SOURCE OR LIGHT SOURCE DISPLAY

(71) Applicant: Stereyo BV, Nazareth (BE)

(72) Inventors: Robbie Thielemans, Nazareth (BE); Vince Dundee, Glendale, CA (US)

(73) Assignee: STEREYO BV, Nazareth (BE)

( * ) Notice: Subject to any disclaimer, the term of this patent is extended or adjusted under 35 U.S.C. 154(b) by 28 days.

(21) Appl. No.: 18/545,532

(22) Filed: Dec. 19, 2023

(65) Prior Publication Data

US 2024/0203336 A1 Jun. 20, 2024

Related U.S. Application Data

(63) Continuation-in-part of application No. 18/233,115, filed on Aug. 11, 2023, now Pat. No. 12,185,585, and a continuation-in-part of application No. 18/351,243, filed on Jul. 12, 2023, and a continuation-in-part of application No. 18/217,201, filed on Jun. 30, 2023, (Continued)

(51) Int. Cl.
*G09G 3/3208* (2016.01)

(52) U.S. Cl.
CPC ... *G09G 3/3208* (2013.01); *G09G 2320/0233* (2013.01); *G09G 2320/0242* (2013.01); *G09G 2320/0626* (2013.01); *G09G 2320/0666* (2013.01); *G09G 2320/0693* (2013.01); *G09G 2354/00* (2013.01); *G09G 2360/16* (2013.01)

(58) Field of Classification Search
CPC ... G09G 2320/0242; G09G 2320/0626; G09G 3/3208; G09G 2320/0233; G09G 2320/0693; G09G 2320/0666; G09G 2360/16; G09G 3/2003; G09G 2354/00; H10K 59/1216; H10K 59/1213; H10K 59/131; H10K 59/35

See application file for complete search history.

(56) References Cited

U.S. PATENT DOCUMENTS 5,767,818 A 6/1998 Nishida
6,055,071 A 4/2000 Kuwata et al.

(Continued)

FOREIGN PATENT DOCUMENTS

BE 20195196 3/2019
BE 20195142 7/2019

(Continued)

OTHER PUBLICATIONS

Belgian Search Report from Belgian Patent Application No. BE202305595, Nov. 21, 2023.

(Continued)

*Primary Examiner* — Muhammad N Edun
(74) *Attorney, Agent, or Firm* — Workman Nydegger

(57) ABSTRACT

A method and related system are disclosed for altering the light output of a light source, or for altering the light output and/or white point of a light source display, such as an RGB LED or OLED display, herewith using only correction data, which could be brightness correction data, and amongst which for example calibration data could be used. Hence, the need to perform cumbersome measurements and/or adaptations is herewith limited or avoided.

22 Claims, 5 Drawing Sheets

Related U.S. Application Data now Pat. No. 12,119,330, and a continuation-in-part of application No. 18/217,268, filed on Jun. 30, 2023, now Pat. No. 12,080,224, and a continuation-in-part of application No. 18/217,261, filed on Jun. 30, 2023, now Pat. No. 12,199,079, and a continuation-in-part of application No. 18/216,459, filed on Jun. 29, 2023, now Pat. No. 12,100,363, and a continuation-in-part of application No. 18/322,279, filed on May 23, 2023.

(60) Provisional application No. 63/433,646, filed on Dec. 19, 2022.

(56) References Cited

U.S. PATENT DOCUMENTS 6,483,555 B1 11/2002 Thielemans et al.
6,717,625 B1 4/2004 Thielemans
7,015,902 B2 3/2006 Nagai et al.
7,019,721 B2 3/2006 Thielemans et al.
7,071,620 B2 7/2006 Devos et al.
7,071,894 B1 7/2006 Thielemans et al.
7,079,092 B2 7/2006 Tanghe et al.
7,102,601 B2 9/2006 Devos et al.
7,157,838 B2 1/2007 Thielemans et al.
7,176,861 B2 2/2007 Dedene et al.
7,205,729 B2 4/2007 Thielemans et al.
7,227,519 B1 6/2007 Kawase et al.
7,262,753 B2 8/2007 Tanghe et al.
7,301,273 B2 11/2007 Dedene et al.
7,365,720 B2 4/2008 Bouwens et al.
7,443,466 B2 10/2008 Dedene et al.
7,777,691 B1 8/2010 Nimmer et al.
D730,309 S 5/2015 Hochman et al.
9,069,519 B1 6/2015 Hall
D751,998 S 3/2016 Hochman et al.
9,380,720 B2 6/2016 Thielemans et al.
9,477,438 B1 10/2016 Hochman et al.
D771,844 S 11/2016 Hochman et al.
9,524,666 B2 12/2016 Hochman et al.
9,660,403 B2 5/2017 Hochman et al.
10,325,541 B2 6/2019 Hochman et al.
10,333,109 B2 6/2019 Hochman et al.
10,892,297 B2 1/2021 Chae et al.
10,917,679 B2 2/2021 Dunning et al.
11,310,436 B2 4/2022 Hochman et al.
11,328,655 B2 5/2022 Sugiyama et al.
11,445,123 B2 9/2022 Deighton
11,496,726 B2 11/2022 Deighton
11,552,061 B2 1/2023 Chae et al.
11,610,543 B2 3/2023 Thielemans et al.
11,695,907 B2 7/2023 Steudel et al.
11,881,151 B2 1/2024 Thielemans et al.
11,924,560 B2 3/2024 Thielemans et al.
11,948,501 B2 4/2024 Thielemans et al.
11,948,506 B2 4/2024 Thielemans et al.
2002/0163513 A1 11/2002 Tsuji
2003/0095138 A1 5/2003 Kim et al.
2003/0128299 A1 7/2003 Coleman et al.
2003/0133619 A1 7/2003 Wong et al.
2004/0113875 A1 6/2004 Miller et al.
2004/0207315 A1 10/2004 Thielemans et al.
2004/0212582 A1 10/2004 Thielemans et al.
2004/0233125 A1 11/2004 Tanghe et al.
2004/0233148 A1 11/2004 Tanghe et al.
2005/0017922 A1 1/2005 Devos et al.
2005/0052375 A1 3/2005 Devos et al.
2005/0116667 A1 6/2005 Mueller et al.
2005/0122406 A1 6/2005 Voss et al.
2005/0128751 A1 6/2005 Roberge et al.
2005/0133761 A1 6/2005 Thielemans
2005/0134525 A1 6/2005 Tanghe et al.
2005/0134526 A1 6/2005 Willem et al.
2005/0213128 A1 9/2005 Imai et al.
2006/0022914 A1 2/2006 Kimura et al.
2006/0139238 A1 6/2006 Chiba et al.
2006/0290614 A1 12/2006 Nathan et al.
2007/0081357 A1 4/2007 Kim et al.
2007/0241988 A1 10/2007 Zerphy et al.
2007/0253008 A1 11/2007 Edge et al.
2007/0263394 A1 11/2007 Thielemans et al.
2008/0046217 A1 2/2008 Polonskiy et al.
2008/0079816 A1 4/2008 Yen et al.
2008/0111773 A1 5/2008 Tsuge
2008/0165081 A1 7/2008 Lawther et al.
2008/0238950 A1* 10/2008 Saglam .................... G09G 3/32 345/83
2008/0285981 A1 11/2008 Diab et al.
2009/0009103 A1 1/2009 McKechnie et al.
2009/0066631 A1 3/2009 Lianza
2009/0102957 A1 4/2009 Phelan
2009/0103200 A1 4/2009 Feklistov et al.
2009/0295706 A1 12/2009 Feng
2010/0001648 A1 1/2010 De Clercq et al.
2010/0103200 A1 4/2010 Langendijk
2010/0243025 A1 9/2010 Bhatia et al.
2010/0289783 A1 11/2010 Leppla
2010/0302284 A1 12/2010 Karaki
2010/0309218 A1 12/2010 Suen et al.
2011/0103013 A1 5/2011 Furukawa
2011/0121761 A1 5/2011 Zhao
2011/0176029 A1 7/2011 Boydston et al.
2012/0019633 A1 1/2012 Holley
2012/0033876 A1 2/2012 Momeyer et al.
2012/0062622 A1 3/2012 Koyama et al.
2012/0133837 A1 5/2012 Furukawa
2012/0287289 A1 11/2012 Steinberg et al.
2012/0307243 A1 12/2012 Elliott
2012/0313979 A1 12/2012 Matsuura
2013/0162696 A1 6/2013 Matsumoto
2013/0181884 A1 7/2013 Perkins et al.
2013/0194199 A1* 8/2013 Lynch .................. G06F 3/0421 445/24
2013/0226495 A1 8/2013 Marcu et al.
2013/0249377 A1 9/2013 Hamer et al.
2013/0272023 A1 10/2013 Lai
2014/0002718 A1 1/2014 Spielberg
2014/0009485 A1 1/2014 Asanuma
2014/0009505 A1 1/2014 Moon et al.
2014/0049571 A1 2/2014 Erinjippurath et al.
2014/0049983 A1 2/2014 Nichol et al.
2014/0125818 A1 5/2014 Friend
2015/0070402 A1 3/2015 Shah et al.
2015/0186097 A1 7/2015 Hall
2015/0229919 A1 8/2015 Weber et al.
2015/0339977 A1 11/2015 Nathan et al.
2015/0348479 A1 12/2015 Kim et al.
2015/0371405 A1 12/2015 Zhao
2016/0078802 A1 3/2016 Liang et al.
2016/0124091 A1 5/2016 Kawahito et al.
2016/0182790 A1 6/2016 Horesh
2016/0275835 A1 9/2016 Yuan et al.
2016/0335958 A1 11/2016 Huang et al.
2017/0032715 A1 2/2017 Sutherland et al.
2017/0032742 A1 2/2017 Piper et al.
2017/0061924 A1 3/2017 Lee et al.
2017/0069871 A1 3/2017 Yim et al.
2017/0171492 A1 6/2017 Naito
2017/0284630 A1 10/2017 Sergenese et al.
2017/0318178 A1 11/2017 Debevec et al.
2018/0018793 A1 1/2018 Min et al.
2018/0060014 A1 3/2018 Son et al.
2018/0090102 A1 3/2018 Chappalli et al.
2018/0091860 A1 3/2018 Stokking et al.
2018/0131160 A1 5/2018 Zhang et al.
2018/0235052 A1 8/2018 Tada
2018/0240409 A1 8/2018 Li et al.
2018/0342224 A1 11/2018 Beon et al.
2019/0064923 A1 2/2019 Taniguchi
2019/0080656 A1 3/2019 Herranz et al.
2019/0098293 A1 3/2019 Lee et al.
2019/0132560 A1 5/2019 Grosse et al.
2019/0172404 A1 6/2019 Zhu
2019/0209858 A1 7/2019 Slaughter et al.

(56) References Cited

U.S. PATENT DOCUMENTS

| | | | | |
|---|---|---|---|---|
| 2019/0212719 | A1 | 7/2019 | Ono | |
| 2019/0213951 | A1 | 7/2019 | Li et al. | |
| 2019/0244561 | A1 | 8/2019 | Zong et al. | |
| 2019/0251929 | A1* | 8/2019 | Fossati | G01J 3/463 |
| 2019/0295457 | A1 | 9/2019 | Li et al. | |
| 2019/0306477 | A1 | 10/2019 | Nordback | |
| 2019/0356940 | A1 | 11/2019 | Mallett | |
| 2019/0364309 | A1 | 11/2019 | Von Braun et al. | |
| 2019/0377535 | A1 | 12/2019 | Rycyna et al. | |
| 2020/0014904 | A1 | 1/2020 | Wetzstein et al. | |
| 2020/0027386 | A1 | 1/2020 | Wang et al. | |
| 2020/0037011 | A1 | 1/2020 | Zong et al. | |
| 2020/0043201 | A1 | 2/2020 | Tanaka et al. | |
| 2020/0098333 | A1 | 3/2020 | Marcu | |
| 2020/0126501 | A1 | 4/2020 | Yamazaki et al. | |
| 2020/0160791 | A1 | 5/2020 | Chung | |
| 2020/0225903 | A1 | 7/2020 | Cohen | |
| 2020/0280761 | A1 | 9/2020 | Staples | |
| 2020/0286424 | A1 | 9/2020 | Thielemans et al. | |
| 2020/0388210 | A1 | 12/2020 | Thielemans et al. | |
| 2020/0403117 | A1 | 12/2020 | Fabien et al. | |
| 2021/0005161 | A1 | 1/2021 | Lee | |
| 2021/0014385 | A1 | 1/2021 | Boggavarapu et al. | |
| 2021/0056937 | A1 | 2/2021 | Sakai | |
| 2021/0124174 | A1 | 4/2021 | Tokunaga et al. | |
| 2021/0125545 | A1 | 4/2021 | Sohn et al. | |
| 2021/0125570 | A1 | 4/2021 | Kang et al. | |
| 2021/0185778 | A1 | 6/2021 | Otten | |
| 2021/0201769 | A1 | 7/2021 | Morris et al. | |
| 2021/0217157 | A1 | 7/2021 | Han et al. | |
| 2021/0225267 | A1 | 7/2021 | Thielemans et al. | |
| 2021/0227270 | A1 | 7/2021 | Braun | |
| 2021/0266624 | A1 | 8/2021 | Zong et al. | |
| 2021/0295766 | A1 | 9/2021 | Sugiyama et al. | |
| 2021/0297717 | A1 | 9/2021 | Braun | |
| 2021/0306394 | A1 | 9/2021 | Zong et al. | |
| 2021/0321032 | A1 | 10/2021 | Braun | |
| 2021/0345058 | A1 | 11/2021 | Itakura et al. | |
| 2021/0366411 | A1 | 11/2021 | Yang et al. | |
| 2021/0383842 | A1 | 12/2021 | Han et al. | |
| 2021/0397398 | A1 | 12/2021 | Han et al. | |
| 2022/0014728 | A1 | 1/2022 | Deighton | |
| 2022/0020727 | A1 | 1/2022 | Noh et al. | |
| 2022/0059045 | A1 | 2/2022 | Kobayashi et al. | |
| 2022/0059607 | A1 | 2/2022 | Murugan et al. | |
| 2022/0060612 | A1 | 2/2022 | Hochman et al. | |
| 2022/0076615 | A1 | 3/2022 | Ding et al. | |
| 2022/0103738 | A1 | 3/2022 | Deighton | |
| 2022/0150456 | A1 | 5/2022 | Steudel et al. | |
| 2022/0191109 | A1 | 6/2022 | Chen et al. | |
| 2022/0246670 | A1 | 8/2022 | Chen et al. | |
| 2022/0254317 | A1 | 8/2022 | Hochman et al. | |
| 2022/0350562 | A1 | 11/2022 | Wang et al. | |
| 2022/0375387 | A1 | 11/2022 | Deighton | |
| 2022/0375403 | A1 | 11/2022 | Cheng et al. | |
| 2022/0413790 | A1 | 12/2022 | Cai et al. | |
| 2023/0013582 | A1 | 1/2023 | Wang et al. | |
| 2023/0154399 | A1 | 5/2023 | Thielemans et al. | |
| 2023/0162400 | A1 | 5/2023 | Liu et al. | |
| 2023/0162662 | A1 | 5/2023 | Zhang et al. | |
| 2023/0163142 | A1 | 5/2023 | Lu et al. | |
| 2023/0186821 | A1 | 6/2023 | Hashempour et al. | |
| 2023/0209207 | A1 | 6/2023 | Hochman et al. | |
| 2023/0274693 | A1 | 8/2023 | Thielemans et al. | |
| 2023/0282153 | A1 | 9/2023 | Thielemans et al. | |
| 2023/0298503 | A1 | 9/2023 | Zhang et al. | |
| 2023/0326175 | A1 | 10/2023 | Zhang et al. | |
| 2024/0022686 | A1 | 1/2024 | Thielemans et al. | |
| 2024/0044465 | A1 | 2/2024 | Thielemans et al. | |

FOREIGN PATENT DOCUMENTS

| | | | |
|---|---|---|---|
| BE | 1026226 | A1 | 11/2019 |
| CN | 102290003 | A | 12/2011 |
| CN | 206741357 | U | 12/2017 |
| CN | 207352560 | U | 5/2018 |
| CN | 110602875 | A | 12/2019 |
| CN | 110617000 | A | 12/2019 |
| DE | 102006054856 | A1 | 1/2009 |
| EP | 1172783 | A1 | 1/2002 |
| EP | 1780798 | A1 | 5/2007 |
| EP | 2323072 | A1 | 5/2011 |
| EP | 3099058 | A1 | 11/2016 |
| EP | 3139422 | A2 | 3/2017 |
| GB | 2469819 | A | 11/2010 |
| JP | 2007062892 | A | 3/2007 |
| JP | 2019214445 | A | 12/2019 |
| KR | 20170065163 | A | 6/2017 |
| TW | 200608327 | A | 3/2006 |
| TW | 200608328 | A | 3/2006 |
| WO | 2013186278 | A1 | 12/2013 |
| WO | 2015114720 | A1 | 8/2015 |
| WO | 2018164105 | A1 | 9/2018 |
| WO | 2019215219 | A1 | 11/2019 |
| WO | 2020253249 | A1 | 12/2020 |
| WO | 2021009719 | A1 | 1/2021 |
| WO | 2022013191 | A1 | 1/2022 |
| WO | 2022064062 | A1 | 3/2022 |
| WO | 2022087322 | A1 | 4/2022 |

OTHER PUBLICATIONS

Response to Belgian Search Report from Belgian Patent Application No. BE2023/5595, filed Mar. 21, 2024.

Extended European Search Report from European Patent Application No. EP23185674.1, Nov. 16, 2023.

Partial European Search Report from European Patent Application No. EP23198096, Nov. 29, 2023.

Extended European Search Report from European Patent Application No. EP23198096.2, Apr. 9, 2024.

Extended European Search Report from European Patent Application No. EP23190432.7, Feb. 12, 2024.

Extended European Search Report from European Patent Application No. EP23160521, Jul. 6, 2023.

Response to Extended European Search Report from European Patent Application No. EP23160521, dated Jan. 29, 2024.

Extended European Search Report from European Patent Application No. EP23218322.8, Mar. 27, 2024.

Extended European Search Report from European Patent Application No. EP23218336.8, Apr. 10, 2024.

Partial European Search Report from European Patent Application No. EP23218348.3, Apr. 30, 2024.

Extended European Search Report from European Patent Application No. EP23218353.3, Mar. 26, 2024.

Extended European Search Report from European Patent Application No. EP23218356.6, Apr. 5, 2024.

Extended European Search Report from European Patent Application No. EP23218377.2, Apr. 24, 2024.

Extended European Search Report from Corresponding European Patent Application No. EP23218377.2, Apr. 24, 2024.

Baker, Simon, "Pulse Width Modulation (PWM)", Mar. 17, 2015, 13 pages, TFT Central.

Burr, David, "Motion Perception: Human Psychophysics", Apr. 18, 2013, pp. 763-776, MIT Press.

Cast, Inc., "Understanding—and Reducing—Latency in Video Compression Systems", Oct. 25, 2013, 7 pages, retrieved from <https://web.archive.org/web/20131025202911/https://www.design-reuse.com/articles/33005/understanding-latency-in-video-compression-systems.html>.

Davis et al., "Humans perceive flicker artifacts at 500 Hz", Feb. 3, 2015, 4 pages, Nature, Scientific Reports.

Kang et al., "Nanoimprinted Semitransparent Metal Electrodes and Their Application in Organic Light-Emitting Diodes," May 21, 2007, 6 pages, Advanced Materials.

Larson, Jennifer, "How Many Frames Per Second Can the Human Eye See?", Oct. 20, 2020, 12 pages, retrieved from <https://www.healthline.com/health/human-eye-fps>.

(56) References Cited

OTHER PUBLICATIONS

Lee et al., “Solution-Processed Metal Nanowire Mesh Transparent Electrodes”, Jan. 12, 2008, pp. 689-692, Nano Letters, vol. 8, No. 2.
Mackin et al., “High Frame Rates and the Visibility of Motion Artifacts”, Jun. 30, 2017, 19 pages, SMPTE Motion Imaging Journal, vol. 126, Issue 5.
Thielemans, Robbie, “Displays Applications of LEDs”, Handbook of Visual Display Technology, May 21, 2011, 14 pages.
Thielemans, Robbie, “LED Display Applications and Design Considerations”, Handbook of Visual Display Technology, May 21, 2011, 5 pages, retrieved from https://link.springer.com/referenceworkentry/10.1007/978-3-540-79567-4_76.
Tobii Connect, “The speed of human visual perception”, Sep. 14, 2022, 1 page, retrieved from <https://connect.tobii.com/s/article/the-speed-of-human-perception?language=en_US>.
Wilson, Derek, “Exploring Input Lag Inside Out”, Jul. 16, 2019, 2 pages, retrieved from <https://www.anandtech.com/show/2803>.
Zhang, Yin, “Performance Characteristics of Lithium Coin Cells for Use in Wireless Sensing Systems”, Jun. 17, 2012, 143 pages, All Theses and Dissertations, Brigham Young University.
“The Ins and Outs of HDR—Gamma Curves”, Jun. 8, 2020, 3 pages, retrieved from <https://www.eizoglobal.com/library/management/ins-and-outs-of-hdr/index2.html>.
Extended European Search Report from corresponding EP Application No. EP18198749.6, Nov. 12, 2018.
International Search Report and Written Opinion from PCT Application No. PCT/EP2019/061804, Jun. 13, 2019.
Applicant’s Amendment/Remarks filed at the EPO on Feb. 20, 2020 for PCT/EP2019/061804.
Applicant’s Amendment/Remarks filed at the EPO on May 26, 2020 for PCT/EP2019/061804.
International Preliminary Report on Patentability from PCT/EP2019/061804, Jul. 10, 2020.
Belgian Search Report from BE Application No. 201905196, Aug. 13, 2019.
Search Report for BE 2019/05759 mailed Jan. 23, 2020, 18 pages.
Belgian Search Report for Belgian Patent Application No. BE2019/5970, Jul. 24, 2020.
Response to Belgian Search Report for Belgian Patent Application No. BE2019/5970, filed by Applicant at the Belgian Patent Office on Nov. 24, 2020.
Belgian Search Report from corresponding Belgian Application No. BE 202205007, Jun. 7, 2022.
Extended European Search Report from corresponding EP Application No. 22185014.2, Dec. 8, 2022.
Office Action from European Application No. 19722133.6, Jan. 19, 2023.
Wikipedia, “MAC Address”, 10 pages, retrieved from <https://en.wikipedia.org/wiki/MAC_address>, retrieved May 30, 2023.

* cited by examiner

SYSTEMS AND METHODS FOR ALTERING LIGHT OUTPUT AND WHITE POINT OF A LIGHT SOURCE OR LIGHT SOURCE DISPLAY

CROSS-REFERENCE TO RELATED APPLICATIONS

This application claims the benefit of and priority to U.S. Provisional Patent Application Ser. No. 63/433,646 filed on Dec. 19, 2022 and entitled "Modular Display with Integrated on Camera Feature Sets," which is expressly incorporated herein by reference. This application is also a continuation-in-part of and claims priority to each of the following applications: U.S. application Ser. No. 18/322,279, filed May 23, 2023; U.S. application Ser. No. 18/351,243, filed Jul. 12, 2023; U.S. application Ser. No. 18/216,459, filed Jun. 29, 2023; U.S. application Ser. No. 18/217,201, filed Jun. 30, 2023; U.S. application Ser. No. 18/217,261, filed Jun. 30, 2023; U.S. application Ser. No. 18/217,268, filed Jun. 30, 2023; and U.S. application Ser. No. 18/233,115, filed Aug. 11, 2023, the contents of each of which are expressly incorporated herein by reference.

TECHNICAL FIELD

This disclosure relates to color adaptation or color adjustment techniques for light source displays, such as for example Light-Emitting Diode (LED) or Organic Light-Emitting Diode (OLED) displays, or for (stand-alone) light sources. In particular, this disclosure relates to a method and related system for altering the light output of a light source, or for altering the light output and/or white point of a display, such as an RGB (Red, Green, Blue) LED or OLED display, herewith using only correction data, which could be brightness correction data, and amongst which for example calibration data could be used.

BACKGROUND

In basic terms, white point determines the "color of white" on a light source display. In particular, white point is the temperature setting, typically measured in degrees Kelvin, that determines the warmth or coolness of the whites. Selecting a warm color temperature such as 5000K or D50 will create a warm-colored white (or yellowish white), whereas a higher temperate setting such as 6500K or D65 will create a white that is slightly cooler. Cool white at 7500K or D75 is also referred to blueish white. While D50 being rather standard allowing for good color balance comparison and visual inspection purposes, D65 can be applied to simulate the quality of daylight at noon and is also a common setting. Usually, when working with video or moving images on a light source display, the recommended white point is 6500K or D65, also known as the native temperature of the screen. By setting the white point of the display, the quality of light is determined for on-screen color use.

Current monitors can be provided with tools to measure and set the white point (RGB) settings that may result in the desired white point. However, performing such measurements and subsequent adaptation of settings is quite cumbersome and time-consuming. The knowledge of such measurements is although very useful to enable changing the white point and possibly other color settings. Such measurements are very rarely stored and delivered with a light source display. In general, displays are delivered with stored calibration values of the white point, but not with real measurements thereof. The user is therefore forced or obliged to carry out measurements him/herself in order to be able to alter the white point or any other color setting.

Hence, there is a need for a simple and quick manner for altering the white point and/or light output of a light source display, and more generally also for a light source stand-alone, i.e., not being incorporated in a display.

SUMMARY OF THE INVENTION

An object of this disclosure is to provide a system and corresponding method for altering the light output and/or white point of a light source display, or light source as such. In particular, an object of the invention is that the provided system and method allow such altering in a quick and easy way, and therefore is based only on using and calculating correction data. Hence, the need to perform cumbersome measurements and/or adaptations is herewith limited or avoided.

Overall, the invention provides a versatile method for adjusting the color output of a light source display, allowing for fine-tuning of primary colors and white point without requiring additional physical measurements. It can be applied to display systems and/or displays (comprising a light source) but alternatively, the method is also applicable to simple lights or light sources. Further, the method accounts for various scenarios where only calibration data may be available or can be retrieved.

In a first aspect of the invention, a system is provided comprising: at least one light-emitting element (LEE), said at least one LEE comprising at least three primary colors and having a light output, wherein said light output of said at least one LEE is driven or modulated by a signal for each of said at least three primary colors; a processor configured to adjust (or correct) said light output of said at least one LEE for each of said at least three primary colors to a target light output; a storage configured to store correction parameters (e.g. calibration data) that are configured to be used to adjust (or correct) said light output of said at least one LEE for each of said at least three primary colors to said target light output; wherein the processor is further configured to perform a mathematical calculation of one or more new correction parameters (e.g. new calibration data) based on said target light output or desired light output of the primary color set comprising said at least three primary colors, based on previous correction parameters (e.g. retrieved from the storage), and/or based on a new target light output; and wherein the processor is further configured to implement the calculated one or more new correction parameters and thereby modify said light output (or said target light output) to said new target light output based on said mathematical calculation.

According to an embodiment, the mathematical calculation includes determining one or more calibration matrices.

According to an embodiment, the at least three primary colors (of said at least one LEE) are Red (R), Green (G) and Blue (B).

According to another embodiment, the at least one LEE comprises a choice of Light Emitting Diodes (LEDs), Organic Light Emitting Diodes (OLEDs), or any other light emissive technology.

According to an embodiment, the system is a lighting system.

According to an embodiment, the system is a light source display system having a white point.

According to an embodiment thereof, the white point of said light source display system is based on the mathematical calculation.

According to an embodiment, the light source display system is configured to render visual content using said light output, said target light output or said new target light output of said at least one LEE.

According to an embodiment, the at least one light-emitting element (LEE) includes an array of a plurality of light-emitting elements (LEEs).

According to an embodiment, the correction parameters include calibration data.

According to an embodiment, the processor is configured to adjust said light output of said at least one LEE independently of separately for each of said at least three primary colors to a target light output.

According to an embodiment, the mathematical calculation of the one or more new correction parameters includes calculating new calibration data.

According to an embodiment, the processor is configured to perform the mathematical calculation of the one or more new correction parameters based on said target light output or desired light output of the primary color set comprising said at least three primary colors, based on the previous correction parameters, and/or based on the new target light output.

According to an embodiment, the processor includes a single processing unit or is a processing system including a plurality of processing units.

According to an embodiment, the system further comprises a light-emitting display or lighting system comprising said at least one light-emitting element (LEE).

According to an embodiment thereof, the light-emitting display or lighting system, the processor, and the storage are arranged within a same housing.

According to an embodiment, the system further comprises a plurality of light-emitting displays or lighting systems, each of the light-emitting displays or lighting systems comprising at least one light-emitting element (LEE), wherein the processor is a central processor for the plurality of light-emitting displays or lighting systems and is configured to adjust the light output of each of said at least one LEEs of each the plurality of light-emitting displays or lighting systems, and is further configured to perform said mathematical calculation of one or more new correction parameters for each of said at least one LEEs of each of the plurality of light-emitting displays or lighting systems.

In a second aspect of the invention, a method is provided for altering a light output to a new target light output of one or more light-emitting elements (LEEs) of a display system being a lighting system or a light source display system comprising said one or more LEEs, (each of) said one or more LEEs comprising at least three primary colors, said method comprising: (i) measuring said light output for each of said one or more LEEs of said lighting system or said display system according to each of said at least three primary colors; (ii) retrieving or calculating correction parameters used for altering said light output; (iii) calculating new correction parameters based on a target light output, previous correction parameters, and/or said new target light output, said calculating in particular including determining one or more calibration matrices; and (iv) applying the calculated new correction parameters to said light output of said LEEs, herewith altering said light output to said new target light output based on said calculating.

According to an example, said system is a light source display system having a white point, and said method herewith altering the white point of said light source display system.

According to another example, said at least three primary colors (of said at least one LEE) are Red (R), Green (G) and Blue (B).

In a third aspect, a hardware storage device is provided having stored thereon computer-executable instructions which, when executed by one or more processors of a lighting system or a display system cause one or more processors to perform the above method in accordance with the second aspect.

DETAILED DESCRIPTION

Figure 1:
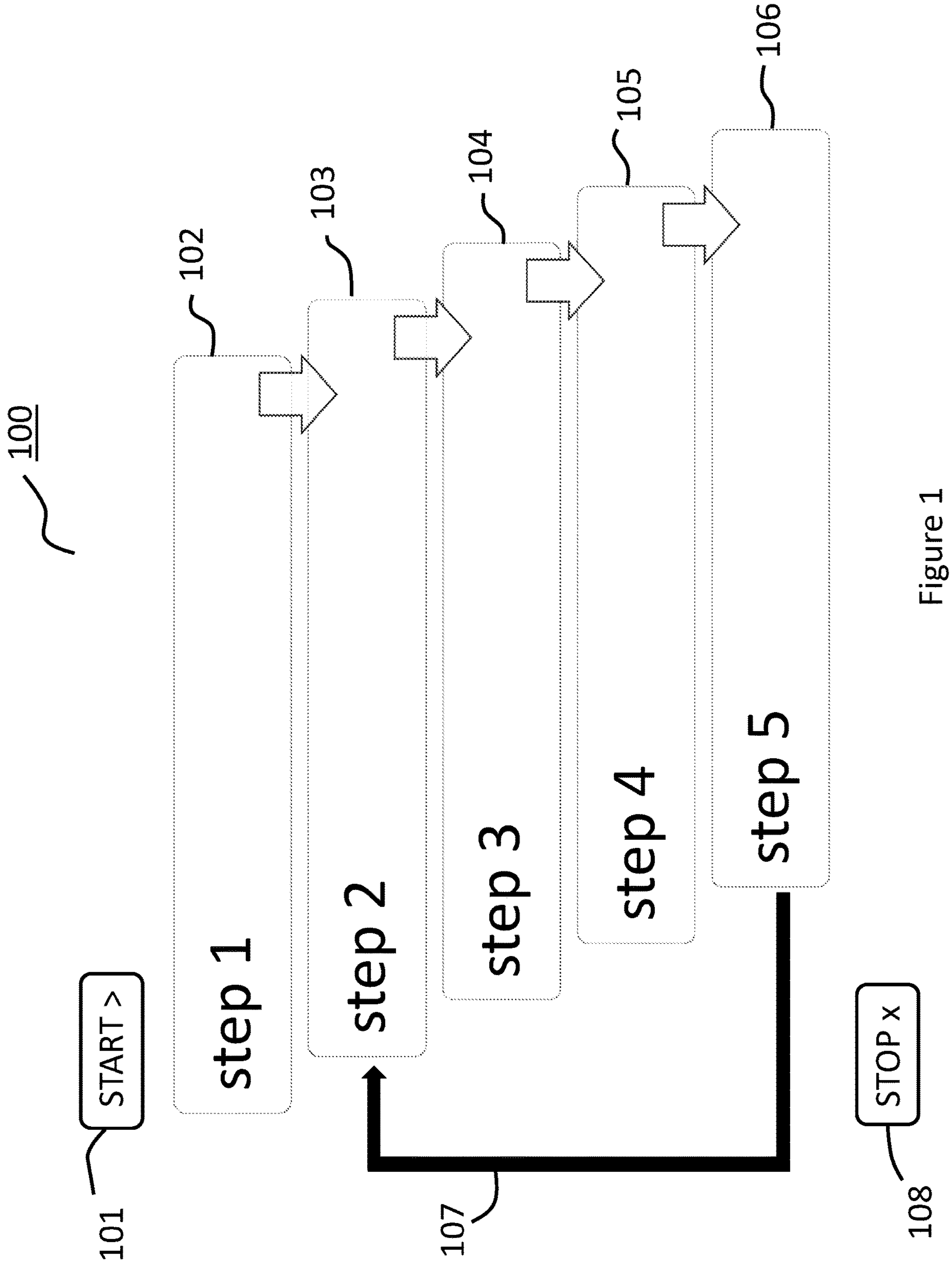
FIG. 1 illustrates a flowchart embodiment describing a method for altering the light output and/or white point of a light source display, based only on using and calculating correction data, in accordance with the invention.

The invention presents a method and system for altering the white point of a light source display, such as for example an RGB LED or OLED display, herewith using only correction data. Manipulating the white point setting of a display will impact and define the mood of the images being displayed thereon. Current method builds further on prior patent applications of the same Applicant, amongst which: U.S. patent application Ser. No. 16/813,113, filed at the USPTO on Mar. 9, 2020 (which is referred to herein as the "Stretch display" application), U.S. patent application Ser. No. 16/895,872, filed at the USPTO on Jun. 8, 2020 (which is referred to herein as the "Studio display" application), U.S. patent application Ser. No. 17/865,096, filed at the USPTO on Jul. 14, 2022 (which is referred to herein as the "Studio2" application), and U.S. patent application Ser. No. 17/981,898, filed at the USPTO on Nov. 7, 2022 (which is referred to herein as the "Subdelta" application), the contents of each of which are incorporated herein by reference, and involving a mathematical process centered on color calibration, target colors, and calibration matrices.

According to an example, the steps of the method for altering the white point of a light source display, in accordance with the invention, include:

1. Color Measurement: In a first step, the method starts with the measurement of the display, wherein measurements are taken for the individual primary colors (e.g., Red, Green, and Blue) at their highest brightness settings.
2. Defining Target Colors: The desired primary colors, known as "target colors" are specified. These target colors can be different from the original primary colors of the display, as measured in the first step.

3. Calibration Matrices: Calibration matrices can then be defined, herewith calculating how much contribution of each original primary color (e.g., Red, Green, and Blue) is needed to achieve the desired target colors. This involves mathematical operations resulting into the calibration data, thus calibration matrices.
4. Altering the White Point: According to a next step, the method allows for the alteration of the display's white point by changing the target colors to a new known and desired target and subsequently calculate new calibration data, using herewith former calibration data and former known targets. This means that not only the primary colors can be adjusted, but also the overall color temperature or white point of the display can be adapted.
5. Solving for New Calibration Matrix: Importantly, in a further step, the method enables the derivation of a new calibration matrix (i.e., having new calibration data) without the need for intermediate measurements of primary colors. This is a significant efficiency improvement.

While referring to the 'Calibration Matrices' step, it is noted that it happens often that calibration data (e.g., regarding white point of a display) are stored and delivered with the display. Hence, a calibration matrix is defined. Whenever a desired target of primary colors is now defined by a user, the measurements for the primary colors can be calculated, using this calibration matrix.

This patent application builds further on the same Applicant's earlier filed US Patent Applications as yet mentioned above (in the summary of the invention), the contents of each of which are incorporated herein by reference. In general, focus is now made on a light source display system, modular in this case, as this is most complex to handle (as compared to non-modular). With modular display system is meant here that just one display can be considered, or a plurality of displays can be combined to appear together as one (large) screen or unity. Hence, the display system can be as small or as big as wanted, or as the particular application of the display system requires. Nevertheless, it can also be done on non-modular displays, for example, one single display to be used as such (e.g., standalone), not in combination with other displays. In particular, a system and corresponding method are disclosed in relation to color adaptation or color adjustment techniques for light source displays, including more generally for light sources as such, i.e., standalone. The idea is herewith to retrieve measurements from calibrated data, and this ultimately for altering the light output and/or white point of a light source display, such as for example a LED or OLED display. Alternatively, the system and method can also be used for altering the light output of a standalone light source.

Previously, in multiple patent applications from the same Applicant, the topic of calibration has been touched, amongst which in the "Stretch display" (U.S. patent application Ser. No. 16/813,113), the "Studio display" (U.S. patent application Ser. No. 16/895,872), the "Studio2" (U.S. patent application Ser. No. 17/865,096) and the "Subdelta" (U.S. patent application Ser. No. 17/981,898) patent applications. A detailed description about how calibration on display level and on pixel level can be performed real time is not repeated here, although relevant mathematics needed for the present invention are rephrased below.

Assume a light source display having RGB primary colors and subsequently, these individual primary colors are measured each at their highest brightness. 'In' values are here the actual measured values of the display (or individual pixels).

$$Rin = (Rinx, Riny, RinY) = (RinX, RinY, RinZ)$$

$$Gin = (Ginx, Giny, GinY) = (GinX, GinY, GinZ)$$

$$Bin = (Binx, Biny, BinY) = (BinX, BinY, BinZ)$$

Assume, for getting a certain and defined color space, these individual colors are not the desired primary colors. Assume we want to set these to desired primary colors, e.g., colors used in NTSC color space. We name these desired colors as the target colors.

$$Rtarg = (Rtargx, Rtargy, RtargY) = (RtargX, RtargY, RtargZ)$$

$$Gtarg = (Gtargx, Gtargy, GtargY) = (GtargX, GtargY, GtargZ)$$

$$Btarg = (Btargx, Btargy, BtargY) = (BtargX, BtargY, BtargZ)$$

Next, we define for example for Red:

$$RtargX = RinX \times RonR + GinX \times GonR + BinX \times BonR$$

$$RtargY = RinY \times RonR + GinY \times GonR + BinY \times BonR$$

$$RtargZ = RinZ \times RonR + GinZ \times GonR + BinZ \times BonR$$

Herein, RonR means how much contribution of Red from the native LED needs to be used in the desired or target color of Red. Similarly, GonR means how much Green of the original LED color needs to be added to this Red and so on . . . . It is noted that negative numbers or coefficients are allowed, as described in the "Stretch display" patent application: "While applying the calibration principle, it is not necessary to make the complete set of parameters positive, moreover it may even be preferred for achieving a better color saturation in the individual colors. Negative coefficients are thus allowed and may in general yield the right mixed color, especially when considering white. Negative coefficients mean that the individual color cannot be calibrated (with corresponding calculations) to the saturated target color. However, when taking negative coefficients always into account, they remain "present" and still can have effect when mixing other input colors, herewith preserving the desired color when mixed. When allowing negative coefficients, deeper or more saturated colors can be viewed, or virtually deeper colors are taken into account for the calibration calculations."

In matrix form, this can also be written as:

$$\begin{bmatrix} RinX & GinX & BinX \\ RinY & GinY & BinY \\ RinZ & GinZ & BinZ \end{bmatrix} \times \begin{bmatrix} RonR \\ GonR \\ BonR \end{bmatrix} = \begin{bmatrix} RtargX \\ RtargY \\ RtargZ \end{bmatrix}$$

Subsequently the same can be done for Green and Blue, herewith defining GtargX, GtargY, GtargZ and BtargX, BtargY, BtargZ respectively, and transferring this also to matrix form.

For all three colors, we then have in matrix form:

$$\begin{bmatrix} RinX & GinX & BinX \\ RinY & GinY & BinY \\ RinZ & GinZ & BinZ \end{bmatrix} \times \begin{bmatrix} RonR & RonG & RonB \\ GonR & GonG & GonB \\ BonR & BonG & BonB \end{bmatrix} =$$

-continued $$\begin{bmatrix} RtargX & GtargX & BtargX \\ RtargY & GtargY & BtargY \\ RtargZ & GtargZ & BtargZ \end{bmatrix}$$

Since the input is known (from the measurement) and the target colors are known (as being the desired values), we can solve:

$$(A) = \begin{bmatrix} RonR & RonG & RonB \\ GonR & GonG & GonB \\ BonR & BonG & BonB \end{bmatrix} = \begin{bmatrix} RinX & GinX & BinX \\ RinY & GinY & BinY \\ RinZ & GinZ & BinZ \end{bmatrix}^{-1} \times \begin{bmatrix} RtargX & GtargX & BtargX \\ RtargY & GtargY & BtargY \\ RtargZ & GtargZ & BtargZ \end{bmatrix}$$

Wherein (A) is the calibration matrix.

Assume now there are no means (e.g., no equipment available) for measuring the native colors of a screen (i.e., the values for the 'In' matrix cannot be measured), but there are means available for retrieving the calibration data. Assume that a spectrometer is provided to measure the screen on individual colors, R, G and B. In this case the R, G and B measurements will be considered as the target colors, which are here the colors being viewable on the display. The following math then applies:

$$\begin{bmatrix} RinX & GinX & BinX \\ RinY & GinY & BinY \\ RinZ & GinZ & BinZ \end{bmatrix} \times \begin{bmatrix} RonR & RonG & RonB \\ GonR & GonG & GonB \\ BonR & BonG & BonB \end{bmatrix} \times \begin{bmatrix} RonR & RonG & RonB \\ GonR & GonG & GonB \\ BonR & BonG & BonB \end{bmatrix}^{-1} = \begin{bmatrix} RtargX & GtargX & BtargX \\ RtargY & GtargY & BtargY \\ RtargZ & GtargZ & BtargZ \end{bmatrix} \times \begin{bmatrix} RonR & RonG & RonB \\ GonR & GonG & GonB \\ BonR & BonG & BonB \end{bmatrix}^{-1}$$

This equation then yields:

$$\begin{bmatrix} RinX & GinX & BinX \\ RinY & GinY & BinY \\ RinZ & GinZ & BinZ \end{bmatrix} = \begin{bmatrix} RtargX & GtargX & BtargX \\ RtargY & GtargY & BtargY \\ RtargZ & GtargZ & BtargZ \end{bmatrix} \times \begin{bmatrix} RonR & RonG & RonB \\ GonR & GonG & GonB \\ BonR & BonG & BonB \end{bmatrix}^{-1}$$

Or else:

$$\begin{bmatrix} RinX & GinX & BinX \\ RinY & GinY & BinY \\ RinZ & GinZ & BinZ \end{bmatrix} = \begin{bmatrix} RtargX & GtargX & BtargX \\ RtargY & GtargY & BtargY \\ RtargZ & GtargZ & BtargZ \end{bmatrix} \times (A)^{-1}$$

Wherein the "targ" matrix refers to the target colors, hence the measurements taken for the colors being viewable on the screen, and (A) being the calibration values retrieved.

Hence, the primary colors (initially measured as 'In' values) of the display can be derived. It also becomes clear now, how the target colors of the display can be changed (towards a new known and desired target), and subsequently how calibration data can be rewritten for altering the target colors, as well as the white point of the display. As a result, the overall color temperature or white point of the display can be adapted. The new calibration matrix can be calculated based on former calibration matrix, former known targets, and new known targets.

An exemplary embodiment is now described for defining a new target matrix according to a desired color space e.g. HDTV and desired white point.

This can now be solved without the need for the intermediate 'In' matrix step (i.e. native colors measured).

The calibration matrix and the target matrix are known. The new target matrix has to be defined, but since this a desired parameter, it is also known. The unknown new calibration matrix can now be calculated.

The math is as follows: 'In' matrix (i.e. native colors) will always remain the same as this is physically defined by the display used. A new target matrix (e.g. HDTV one) is now defined at a predefined color temperature also called the "targn" matrix. For being mathematically correct, we subsequently also have to define a new calibration matrix. This gives us the following equation:

$$\begin{bmatrix} RtargnX & GtargnX & BtargnX \\ RtargnY & GtargnY & BtargnY \\ RtargnZ & GtargnZ & BtargnZ \end{bmatrix} \times \begin{bmatrix} RonRn & RonGn & RonBn \\ GonRn & GonGn & GonBn \\ BonRn & BonGn & BonBn \end{bmatrix}^{-1} = \begin{bmatrix} RinX & GinX & BinX \\ RinY & GinY & BinY \\ RinZ & GinZ & BinZ \end{bmatrix} = \begin{bmatrix} RtargX & GtargX & BtargX \\ RtargY & GtargY & BtargY \\ RtargZ & GtargZ & BtargZ \end{bmatrix} \times \begin{bmatrix} RonR & RonG & RonB \\ GonR & GonG & GonB \\ BonR & BonG & BonB \end{bmatrix}^{-1} = \begin{bmatrix} RtargX & GtargX & BtargX \\ RtargY & GtargY & BtargY \\ RtargZ & GtargZ & BtargZ \end{bmatrix} \times (A)^{-1}$$

The new target matrix "targn" is known. The "targ" matrix and the original calibration matrix (A) are also known. Hence, the new calibration matrix (A)n can be solved:

$$\begin{bmatrix} RtargnX & GtargnX & BtargnX \\ RtargnY & GtargnY & BtargnY \\ RtargnZ & GtargnZ & BtargnZ \end{bmatrix} \times \begin{bmatrix} RonRn & RonGn & RonBn \\ GonRn & GonGn & GonBn \\ BonRn & BonGn & BonBn \end{bmatrix}^{-1} = \begin{bmatrix} RtargX & GtargX & BtargX \\ RtargY & GtargY & BtargY \\ RtargZ & GtargZ & BtargZ \end{bmatrix} \times \begin{bmatrix} RonR & RonG & RonB \\ GonR & GonG & GonB \\ BonR & BonG & BonB \end{bmatrix}^{-1}$$

$$Targn \times (A)n^{-1} = Targ \times (A)^{-1}$$

$$Targn \times (A)n^{-1} \times (A)n = Targ \times (A)^{-1} \times (A)n$$

$$Targn = Targ \times (A)^{-1} \times (A)n$$

$$Targ^{-1} \times Targn = Targ^{-1} \times Targ \times (A)^{-1} \times (A)n$$

$$Targ^{-1} \times Targn = (A)^{-1} \times (A)n$$

$$(A) \times Targ^{-1} \times Targn = (A) \times (A)^{-1} \times (A)n$$

$$(A) \times Targ^{-1} \times Targn = (A)n$$

$$(A)n = (A) \times Targ^{-1} \times Targn$$

Hence, the equation for new calibration data or the new calibration matrix (A)n is determined without the need for intermediate 'In' matrix primary color measurements (i.e. native colors).

In summary, the method for performing color adjustment or color correction in accordance with the invention, can be represented by the flow chart, as illustrated in FIG. 1. With this method, the need to perform cumbersome measurements and/or adaptations is limited or avoided.

In particular, FIG. 1 illustrates a flowchart embodiment describing a method performed by a processor or computing unit for altering the light output and/or white point of a light source display, based only on using and calculating correction data, in accordance with the invention. The method 100 is following different steps that are herewith discussed. The method starts with 'START' indication 101, and ends with 'STOP' indication 108. In a first step 102, after 'START' indication 101, the light output of light-emitting elements (LEEs) of the light source display is measured, in particular measurements are taken for the individual primary colors (e.g., RGB) at their highest brightness settings. It is noted that this has to be done only once, while these values are inherent to the display, and therefore will never change. These measured colors are also called the native colors of the display. In a second step 103, the desired primary colors, known as "target colors" are specified, which can be different from the original primary colors of the display, as measured in the first step 102. In a third step 104, correction parameters are retrieved by retrieving calibrated data. Either calibration matrices (i.e. calibration data) can be defined, herewith calculating how much contribution of each original primary color (e.g., RGB) is needed to achieve the desired target colors. This involves mathematical operations, such as matrix calculations. Alternatively, calibration data (e.g., regarding white point of a display) can be stored and delivered with the display. This way, the calibration matrix is known and doesn't have to be calculated anymore. This can be particularly useful, for example, whenever a desired target of primary colors is set by a user, and hence the measurements for the primary colors (i.e. native colors) in case not given or known, or unable to measure physically, can be calculated using this calibration matrix. According to a fourth step 105, new correction data are calculated. The target colors can be changed to a new known and desired target and subsequently calculate new calibration data, using herewith former calibration data and former known targets. In a fifth step 106, the corrections can be applied to the LEEs. The display's white point can be altered, without the need for intermediate measurements of primary colors (i.e. native colors from the first step 102). Hence, the overall color temperature or white point of the display can be adapted. As indicated by the arrow 107, the steps 2 till 5 can be repeated.

As used herein and throughout this disclosure, a processor, or what may be "digital logic" or "a process unit" is used to refer generally to what is understood to be hardware digital logic, digital logic circuitry, control circuitry, or other circuitry or controlling circuitry, a microprocessor, or one or more processors or processing units, controllers or computing devices, based on software or circuitry, that operate based on received or stored instructions, such hardware being formed of one or more integrated circuits or otherwise, which may be implemented on a single metal-oxide-semiconductor integrated circuit chip or otherwise, which may include electronic components, for example, transistors, diodes, resistors, gates, relays, switches, amplifiers, inverters, buffers, and/or capacitors, etc., that are used to receive, process, perform logical operations on, mathematical operations, algorithmic operations, calculations, and/or store signals, data, and/or information, including digital and/or analog signals, or continuous or non-continuous signals, and output one or more signals based thereon.

In addition to the embodiment of FIG. 1, for a light source display in particular, a similar flowchart embodiment can be provided for a standalone light source as such, in accordance with the invention. In other words, the mathematical equations from above for performing color adjustment of a light source display are also applicable for simple lights or light sources. The mathematical equations presented in this disclosure are not limited to complex display systems alone, but in fact they are also applicable to simple lighting systems. In essence, the methodology described here can be extended beyond displays, making it a versatile tool for color correction or color adaptation in various lighting applications. Consider for example a lighting setup which is composed of different light sources with distinct primary colors. The light sources could be traditional light bulbs, LED lights, or any other light-emitting elements. Just as described for the light source displays or display systems, there could be a specific target color or color temperature proposed that is desired and wished to achieve. By employing the same mathematical principles for lighting equipment as for light source displays outlined in this disclosure, the calibration matrices and target colors can be adapted in order to match the desired lighting requirements. This allows for precise adjustments in primary colors and white point, tailoring the lighting to the desired specifications. In practical terms, this means that the method for color adjustment and/or color correction in accordance with the invention, can find applications also in areas such as for example architectural lighting design, photography and videography lighting setups, theater lighting, and any other context where accurate color rendering and control of the white point are crucial. The flexibility of this approach extends its utility beyond light source displays and display applications, making it a valuable tool for achieving desired color outputs in a wide range of lighting and lighting application systems. Whether for use with complex displays or simple lighting fixtures, the method offers a systematic and efficient way to achieve predefined and/or desired color targets.

Figure 2:
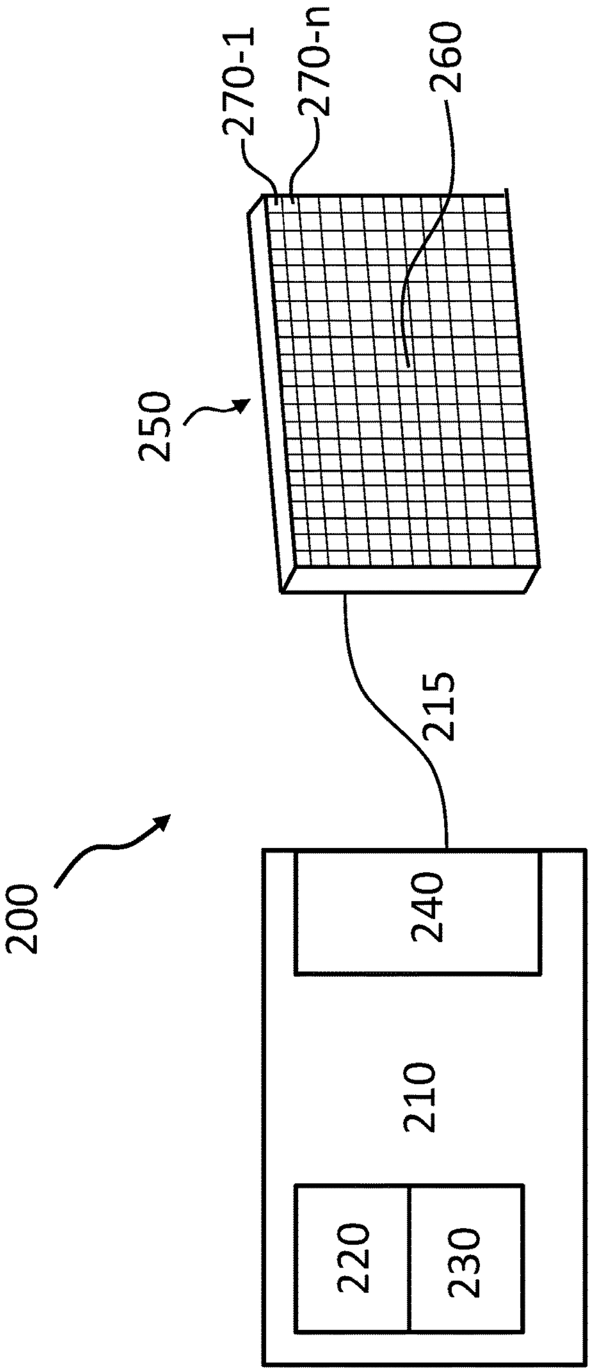
FIG. 2 illustrates a schematic overview of an embodiment of a system as described herein, in accordance with the invention.

FIG. 2 illustrates a schematic overview of an embodiment of a system as described herein that is configured and arranged to perform the methods described herein. As shown in FIG. 2, a system 200 is provided for altering light output. The system 200 includes a light source or light source display 250 (hereinafter referred to as a light source) and a processor 210. The light source 250 includes at least one light-emitting element (LEE) 270-1. In the embodiment of FIG. 2, the light-emitting element (LEE) 270-1 is one of a plurality of LEEs 270-1 . . . **270-*n*, in this embodiment arranged in an array 260 of LEEs. The processor 210 is connected to the light source 250 via communication connection 215 which may be a hardwire connection or a wireless connection. Processor 210 further includes interface 240 configured to output signals to light source 250. Processor 210 may further include, as shown schematically a first memory 220 having stored therein instructions as described herein that cause the processor to execute the methods as described in the methods disclosed herein. The at least one LEE 270-1 includes at least three primary colors and has a light output. Although in this embodiment the LEE includes three primary colors, in other embodiments, the LEE may include more or less than three primary colors. In the embodiment of FIG. 2, the light output of by the LEE 270-1 is driven or modulated by a signal for each of said at least three primary colors. The processor 210 is configured to adjust the light output of at least one LEE 270-1 for each of said at least three primary colors to a target light output. In the embodiment of FIG. 2, the processor 210 is configured to adjust the light output of each of the LEEs 270-1 to 270-*n* for each of said at least three primary colors of the respective LEEs each to a target light output. The system 200 further includes a storage 230, in this embodiment provided with processor 210 configured to store correction parameters that are configured to be used to adjust said light output of said at least one LEE for each of said at least three primary colors to the target light output. The processor 210 is further configured to perform a mathematical calculation of one or more new correction parameters based on said target light output or desired light output of the primary color set comprising said at least three primary colors, based on previous correction parameters, and/or based on a new target light output. In the embodiment of FIG. 2, the processor 210 is configured to perform the mathematical calculation of one or more new correction parameters based on the target light output or desired light output of the primary color set comprising said at least three primary colors, based on previous correction parameters, and based on the new target light output. The processor 210 is further configured to implement the calculated one or more new correction parameters based on a data signal output by the processor 210 through interface 240 and communication connection 215 and thereby modify the light output to said new target light output based on said mathematical calculation. In the embodiment of FIG. 2, the processor 210 is configured to perform the mathematical calculation and implement the calculated new correction parameters for one, some, or each of the primary colors of each of the LEEs 270-1 to 270-*n* or at least a portion of the LEEs 270-1 to 270-*n***.

Figure 3:
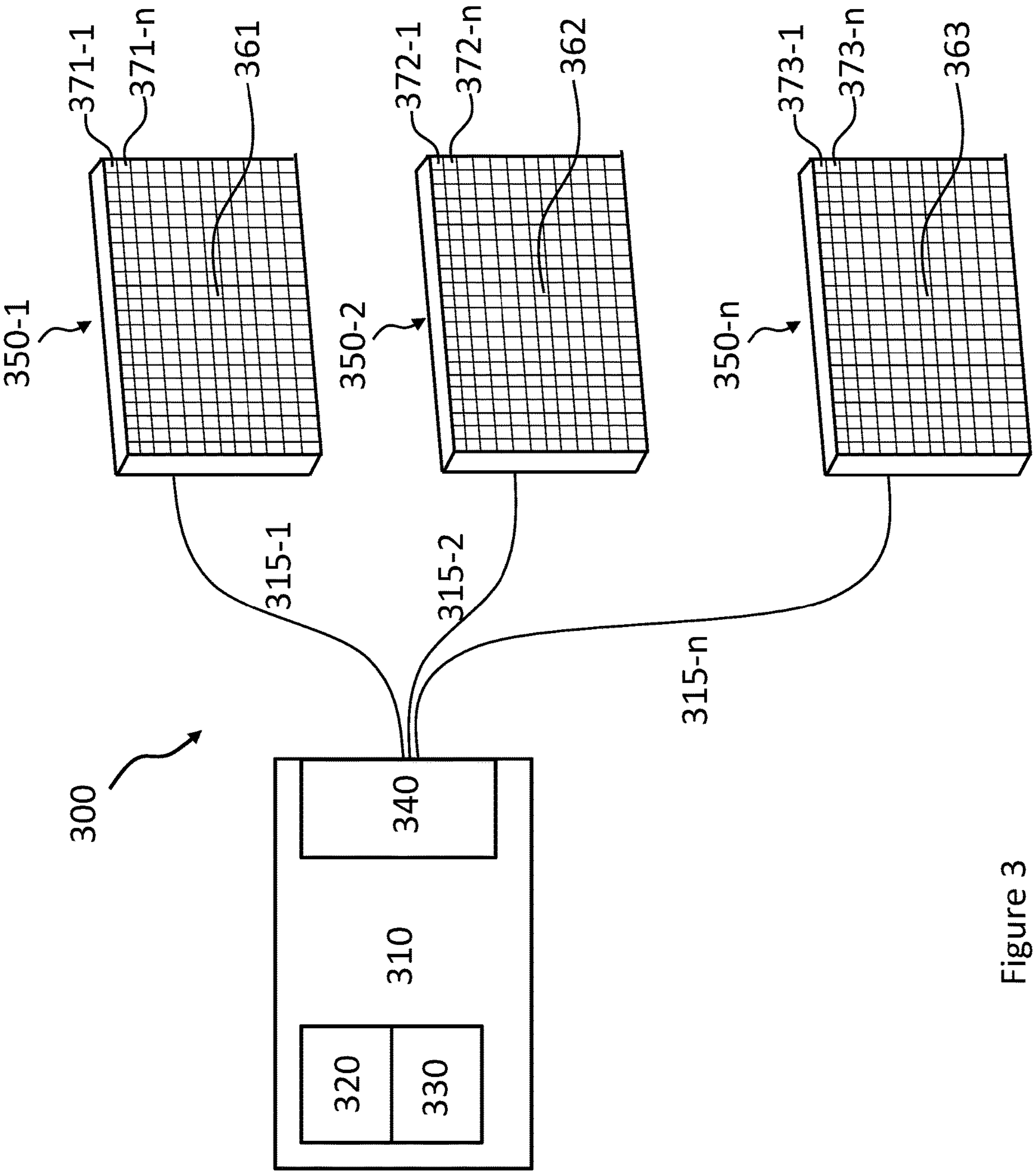
FIG. 3 illustrates a schematic overview of another embodiment of a system as described herein, in accordance with the invention.

FIG. 3 illustrates a schematic overview of another embodiment of a system 300 as described herein. In the embodiment of FIG. 3, the processor 310 is a central processing system, having a single processing unit or a plurality of processing units. The processor 310 is in communication with a plurality of light sources 350-1, 350-2 to **350-*n* via communication connections 315-1, 315-2, 315-*n*, respectively, which may be hardwire or wireless connections, or a combination of hardwire and wireless connections. The processor 310 is provided with storage 320 in which computer-executable instructions are stored therein which, when executed, cause the processor 310 to perform one or more of the methods and functions as described herein. Processor 310 is also provided with interface 340 by which processor 310 communicates or transmits signals to the respective light sources 350-1, 350-2 to 350-*n***.

The at least one LEE 371-1 to **371-*n*, 372-1 to 372-*n*, and 373-1 to 373-*n* of arrays 350-1, 350-2, 350-*n*, respectively each includes at primary colors, in this case, at least three primary colors, and each has a light output. In the embodiment of FIG. 3, the light output of by each of the LEEs 371-1 to 371-*n*, 372-1 to 372-*n*, and 373-1 to 373-*n*, or at least one of these LEEs is driven or modulated by a signal for each of said primary colors, in this example, each of the at least three primary colors. The processor 310 is configured to adjust the light output of at least one LEE, and in a preferred example, for each of the LEEs 371-1 to 371-*n*, 372-1 to 372-*n*, and 373-1 to 373-*n* of arrays 350-1, 350-2, 350-*n* for one, some, or in a preferred embodiment, for each of said at least three primary colors to a target light output. In the embodiment of FIG. 3, the processor 310 is configured to adjust the light output of each of the LEEs 371-1 to 371-*n*, 372-1 to 372-*n*, and 373-1 to 373-*n* of arrays 350-1, 350-2, 350-*n* for each of said at least three primary colors of the respective LEEs each to a target light output. The system 300 further includes a storage 330, in this embodiment provided with processor 310 configured to store correction parameters that are configured to be used to adjust said light output of said at least one LEE for each of said at least three primary colors to the target light output. The processor 310 is further configured to perform a mathematical calculation of one or more new correction parameters based on said target light output or desired light output of the primary color set comprising said at least three primary colors, based on previous correction parameters, and/or based on a new target light output. In the embodiment of FIG. 3, the processor 310 is configured to perform the mathematical calculation of one or more new correction parameters based on the target light output or desired light output of the primary color set comprising said at least three primary colors, based on previous correction parameters, and based on the new target light output. The processor 310 is further configured to implement the calculated one or more new correction parameters based on a data signal output by the processor 210 through interface 240 and communication connection 315-1, 315-2, 315-*n* and thereby modify the light output to said new target light output based on said mathematical calculation. In the embodiment of FIG. 3, the processor 310 is configured to perform the mathematical calculation and implement the calculated new correction parameters for one, some, and preferably each of the primary colors of each of the each of the LEEs 371-1 to 371-*n*, 372-1 to 372-*n*, and 373-1 to 373-*n* of arrays 350-1, 350-2, 350-*n***.

Figures 4A, 4B:
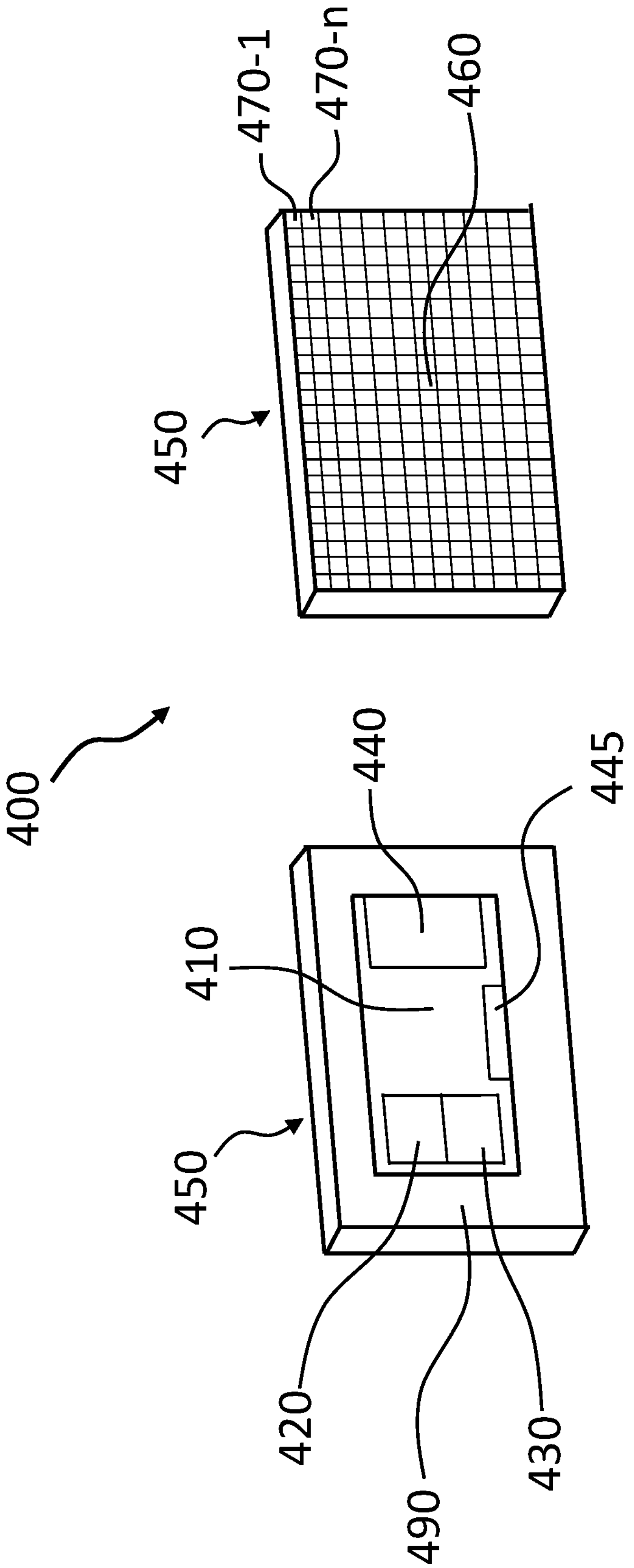
FIGS. 4A and 4B illustrate a schematic overview of another embodiment of a system as described herein, in accordance with the invention.

FIGS. 4A and 4B illustrate a schematic overview of another embodiment of a modular, standalone system 400 is shown. In the embodiment of FIGS. 4A and 4B, the processor 410 is provided coupled to a back side 490. The processor 410 may also be provided within the body or housing of the light source 450. The processor 410 may also be provided or formed integrally with the light source 450. Similar to other embodiments, the light source 450 may have a plurality of LEEs 470-1 to **470-*n*, which may be arranged in an array 460, although an array arrangement is not necessary. The LEEs of the light source 450 each include primary colors, preferably at least three primary colors. The processor 410 includes storage 420 having computer-readable instructions stored therein that cause the processor 410 to perform the light altering methods as described herein. The system 400 further includes a storage 430, in this embodiment provided with processor 410 configured to store correction parameters. Processor 440 is provided with a first interface through which signals are transmitted to the light source (the respective LEEs of the light source). The processor 410 further includes a second interface 445 through which the processor 445** may receive data, stored parameters, updates, or instructions, or data to be displayed, from an outside, non-physically connected device or server.

Figure 5:
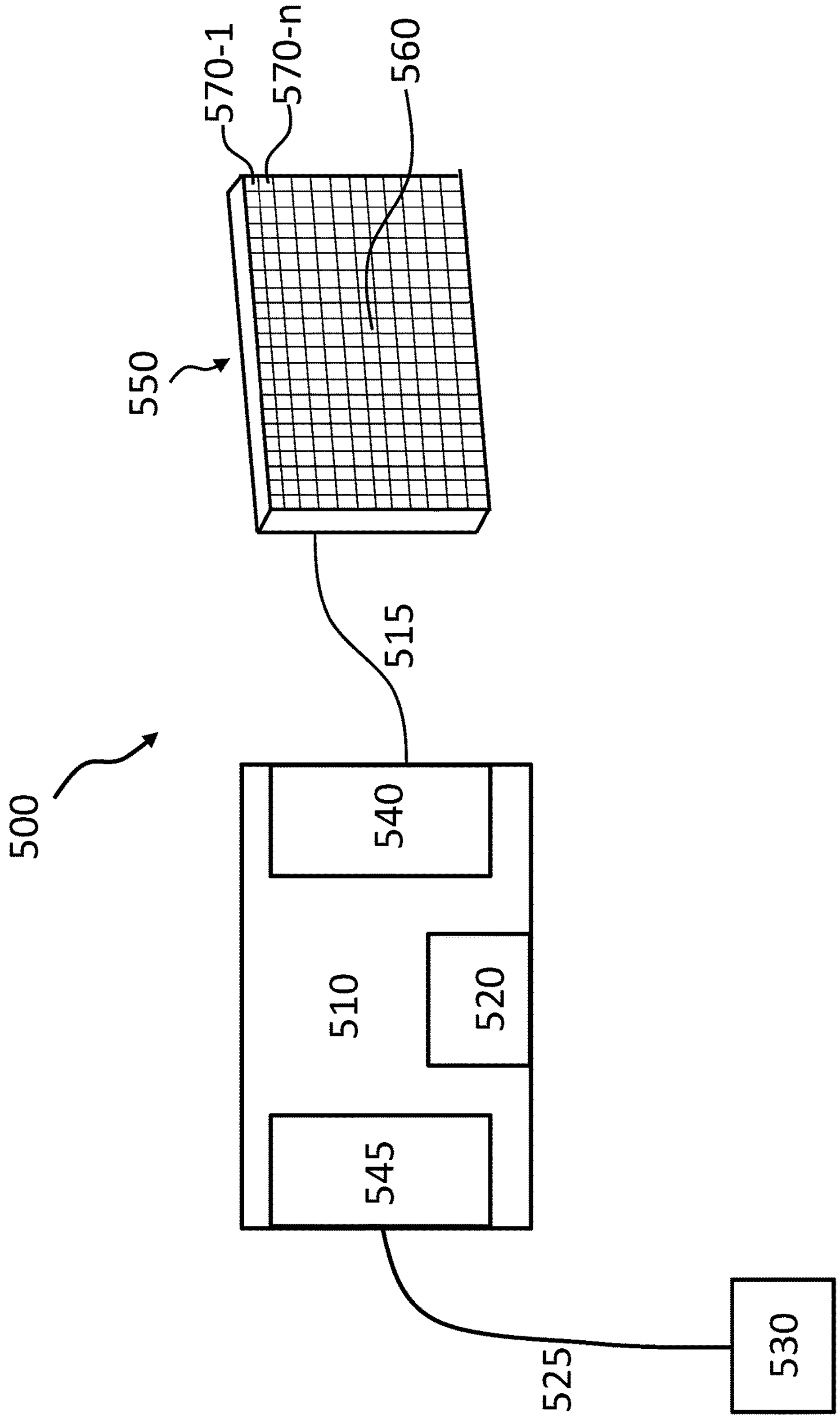
FIG. 5 illustrates a schematic overview of another embodiment of a system as described herein, in accordance with the invention.

FIG. 5 illustrates a schematic overview of another embodiment of a system 500 as described herein. Similar elements of FIG. 5 are similar to those of the embodiments of FIGS. 2, 3, 4A and 4B. In the embodiment of FIG. 5, the processor 510 is provided in communication contact with the light source 550 having LEEs 570-1 to **570-*n* arranged in an array (although not necessarily so) via communication contact 515 and interface 540. The processor 510 includes or has access to storage 520 having computer-readable instructions stored therein that cause the processor 510 to perform the light altering methods as described herein. The system 500 further includes a storage 530, which is separate physical from processor 510 from which processor 510 retrieves correction parameters stored by memory storage 530 via communication channel 525, which may be a hardwire connection, a wireless connection, a local-area connection, or a communication connection across a network of the internet. Processor 540 is provided with a first interface 540 through which signals are transmitted to the light source (the respective LEEs of the light source). The processor 510 further includes a second interface 545 through which the processor 545 may receive data, stored parameters, updates, or instructions, or data to be displayed, from an outside, non-physically connected device or server, for example, the correction parameters retrieved from the storage 530**.

According to the methods and in the systems described herein, the measurements don't need to be at full brightness, but just at 'known' settings. The mathematics or mathematical formula need to be adjusted for that, but it is deemed straightforward. One of the notable advantages of the mathematical framework described with the present invention is its flexibility regarding the measurements of individual primary colors. While this disclosure primarily discusses measurements at the highest brightness settings, it's important to highlight that these measurements don't necessarily have to be taken at full brightness levels. In practical applications, there may be situations where taking measurements at the highest brightness is not feasible or perhaps even not necessary. For instance:

Known Settings: In some cases, it may be sufficient to measure primary colors at specific, known settings rather than their absolute maximum brightness. These settings could correspond to typical operating conditions for the light source display or lighting system.

Energy Efficiency: Full brightness measurements can be resource-intensive and may not align with energy-efficient operation. Measuring at lower settings can provide more practical data without compromising accuracy.

Extended Durability: In cases wherein maintaining the light source display or lighting system at its maximum brightness for extended periods may lead to wear and tear, measuring at lower settings can help preserve the lifetime of the components.

It is noted that adapting the mathematical calculations to accommodate measurements at different settings is entirely feasible and straightforward. The core principles of deriving calibration matrices and adjusting target colors remain the same. The flexibility in measurement settings ensures that this method can be tailored to suit various real-world scenarios and operational constraints.

Alternatively, and rather exceptionally, the measurements can also be found in a datasheet or user interface controlling the light source display. While this disclosure discusses the measurement of primary colors for calibration, it's important to recognize that there are alternative sources of measurement data that can be valuable in the absence of direct measurements or for verification purposes. These alternative sources can be especially useful under exceptional or rare circumstances where direct measurements may be challenging or unavailable. Some of these alternative sources include:

Datasheets: Manufacturers often provide detailed datasheets for light source displays and lighting systems, which include specifications and color information. These datasheets can serve as a valuable source of data for calibration. However, it's important to note that relying solely on datasheet data may not capture real-world variations and conditions. It is therefore typically advantageous to combine this information with actual measurements when possible.

User Interface Data: Many modern light source displays and lighting systems are equipped with user interfaces that allow users to control various parameters, including color settings. These interfaces may provide information about the color characteristics of the system. While this data may not be as precise as direct measurements, it can offer a starting point for calibration.

Historical Data: In situations where a light source display or lighting system has been previously calibrated or characterized, historical calibration data may exist. This data can be a valuable reference point for recalibration or adjustment, particularly if the system's properties have not significantly changed over time.

A key takeaway is that, while direct measurements are ideal for calibration, alternative data sources can be leveraged effectively when direct measurements are not possible or impractical, or insufficient. The mathematical methodology presented with the invention remains adaptable to accommodate data from these alternative sources, allowing for the accurate adjustment of color and white point in various situations or scenarios.

It is important to note that the light-emitting element (LEE) may encompass various technologies, including but not limited to Light Emitting Diodes (LEDs), Organic Light Emitting Diodes (OLEDs), or any other light-emissive or light source technology, offering versatility and adaptability to different light source displays and display system requirements.

Combinability of Embodiments and Features

This disclosure provides various examples, embodiments, and features which improve a visual performance of a display and/or a camera recording an image from the display. Unless expressly stated, or unless such examples, embodiments, and features would be mutually exclusive, the various examples, embodiments, and features disclosed herein should be understood to be combinable with other examples, embodiments, or features described herein.

In addition to the above, further embodiments and examples include the following.

According to a first group of embodiments or examples:

1. A system is provided comprising: at least one light-emitting element (LEE), said at least one LEE comprising at least three primary colors and having a light output, wherein said light output of said at least one LEE is driven or modulated by a signal for each of said at least three primary colors; a processor configured to adjust said light output of said at least one LEE for each of said at least three primary colors to a target light output; a storage configured to store correction parameters that are configured to be used to adjust said light output of said at least one LEE for each of said at least three primary colors to said target light output; wherein the processor is further configured to perform a mathematical calculation of one or more new correction parameters based on said target light output or desired light output of the primary color set comprising said at least three primary colors, based on previous correction parameters, and/or based on a new target light output, and wherein the processor is further configured to implement the calculated one or more new correction parameters and thereby modify said light output to said new target light output based on said mathematical calculation.

2. The system according to any one or a combination of one or more of 1 above and 3-17 below, wherein said mathematical calculation includes determining one or more calibration matrices.
3. The system according to any one or a combination of one or more of 1-2 above and 4-17 below, wherein said at least three primary colors (of said at least one LEE) are Red (R), Green (G) and Blue (B).
4. The system according to any one or a combination of one or more of 1-3 above and 5-17 below, wherein said at least one LEE comprises a choice of Light Emitting Diodes (LEDs), Organic Light Emitting Diodes (OLEDs), or any other light emissive technology.
5. The system according to any one or a combination of one or more of 1-4 above and 6-17 below, wherein said system is a lighting system.
6. The system according to any one or a combination of one or more of 1-5 above and 7-17 below, wherein said system is a light source display system having a white point.
7. The system according to any one or a combination of one or more of 1-6 above and 8-17 below, wherein the white point of said light source display system is based on said calculating.
8. The system according to any one or a combination of one or more of 1-7 above and 9-17 below, wherein said light source display system is configured to render visual content using said light output, said target light output or said new target light output of said at least one LEE.
9. The system according to any one or a combination of one or more of 1-8 above and 10-17 below, wherein the at least one light-emitting element (LEE) includes an array of a plurality of light-emitting elements (LEEs).
10. The system according to any one or a combination of one or more of 1-9 above and 11-17 below, wherein said correction parameters include calibration data.
11. The system according to any one or a combination of one or more of 1-10 above and 12-17 below, wherein said processor is configured to adjust said light output of said at least one LEE independently of separately for each of said at least three primary colors to a target light output.
12. The system according to any one or a combination of one or more of 1-11 above and 13-17 below, wherein the mathematical calculation of the one or more new correction parameters includes calculating new calibration data.
13. The system according to any one or a combination of one or more of 1-12 above and 14-17 below, wherein the processor is configured to perform the mathematical calculation of the one or more new correction parameters based on said target light output or desired light output of the primary color set comprising said at least three primary colors, based on the previous correction parameters, and/or based on the new target light output.
14. The system according to any one or a combination of one or more of 1-13 above and 15-17 below, wherein the processor includes a single processing unit or is a processing system including a plurality of processing units.
15. The system according to any one or a combination of one or more of 1-14 above and 16-17 below, further comprising a light-emitting display or lighting system comprising said at least one light-emitting element (LEE).
16. The system according to any one or a combination of one or more of 1-15 above and 17 below, wherein the light-emitting display or lighting system, the processor, and the storage are arranged within a same housing.
17. The system according to any one or a combination of one or more of 1-16 above, comprising a plurality of light-emitting displays or lighting systems, each of the light-emitting displays or lighting systems comprising at least one light-emitting element (LEE), wherein the processor is a central processor for the plurality of light-emitting displays or lighting systems and is configured to adjust the light output of each of said at least one LEEs of each the plurality of light-emitting displays or lighting systems, and is further configured to perform said mathematical calculation of one or more new correction parameters for of said LEEs of each of the plurality of light-emitting displays or lighting systems.

According to a second group of embodiments or examples:

1. A method is provided for altering a light output to a new target light output of one or more light-emitting elements (LEEs) of a display system being a lighting system or a light source display system comprising said one or more LEEs, said one or more LEEs comprising at least three primary colors, said method comprising: measuring said light output for each of said one or more LEEs of said lighting system or said display system according to each of said at least three primary colors; retrieving or calculating correction parameters used for altering said light output; calculating new correction parameters based on a target light output, previous correction parameters, and/or said new target light output, said calculating in particular including determining one or more calibration matrices; and applying the calculated new correction parameters to said light output of said LEEs, herewith altering said light output to said new target light output based on said calculating.
2. The method according to any one or a combination of one or more of 1 above and 3-17 below, wherein said mathematical calculation including determining one or more calibration matrices.
3. The method according to any one or a combination of one or more of 1-2 above and 4-17 below, wherein said at least three primary colors (of said at least one LEE) are Red (R), Green (G) and Blue (B).
4. The method according to any one or a combination of one or more of 1-3 above and 5-17 below, wherein said at least one LEE comprises a choice of Light Emitting Diodes (LEDs), Organic Light Emitting Diodes (OLEDs), or any other light emissive technology.
5. The method according to any one or a combination of one or more of 1-4 above and 6-17 below, wherein said system is a lighting system.
6. The method according to any one or a combination of one or more of 1-5 above and 7-17 below, wherein said system is a light source display system having a white point.
7. The method according to any one or a combination of one or more of 1-6 above and 8-17 below, wherein the white point of said light source display system is based on said calculating.
8. The method according to any one or a combination of one or more of 1-7 above and 9-17 below, wherein said light source display system is configured to render visual content using said light output, said target light output or said new target light output of said at least one LEE.

9. The method according to any one or a combination of one or more of 1-8 above and 10-17 below, wherein the at least one light-emitting element (LEE) includes an array of a plurality of light-emitting elements (LEEs).

10. The method according to any one or a combination of one or more of 1-9 above and 11-17 below, wherein said correction parameters include calibration data.

11. The method according to any one or a combination of one or more of 1-10 above and 12-17 below, wherein said processor is configured to adjust said light output of said at least one LEE independently of separately for each of said at least three primary colors to a target light output.

12. The method according to any one or a combination of one or more of 1-11 above and 13-17 below, wherein the mathematical calculation of the one or more new correction parameters includes calculating new calibration data.

13. The method according to any one or a combination of one or more of 1-12 above and 14-17 below, wherein the processor is configured to perform the mathematical calculation of the one or more new correction parameters based on said target light output or desired light output of the primary color set comprising said at least three primary colors, based on the previous correction parameters, and/or based on the new target light output.

14. The method according to any one or a combination of one or more of 1-13 above and 15-17 below, wherein the processor includes a single processing unit or is a processing system including a plurality of processing units.

15. The method according to any one or a combination of one or more of 1-14 above and 16-17 below, further comprising a light-emitting display or lighting system comprising said at least one light-emitting element (LEE).

16. The method according to any one or a combination of one or more of 1-15 above and 17 below, wherein the light-emitting display or lighting system, the processor, and the storage are arranged within a same housing.

17. The method according to any one or a combination of one or more of 1-16 above, comprising a plurality of light-emitting displays or lighting systems, each of the light-emitting displays or lighting systems comprising at least one light-emitting element (LEE), wherein the processor is a central processor for the plurality of light-emitting displays or lighting systems and is configured to adjust the light output of each of said at least one LEEs of each the plurality of light-emitting displays or lighting systems, and is further configured to perform said mathematical calculation of one or more new correction parameters for of said LEEs of each of the plurality of light-emitting displays or lighting systems.

18. The method according to any one or a combination of one or more of 1-17 above, wherein said system is a light source display system having a white point, and said method herewith altering the white point of said light source display system.

19. A hardware storage device having stored thereon computer-executable instructions which, when executed by one or more processors of a lighting system or a display system cause one or more processors to perform the method to any one or a combination of one or more of 1-18 above.

Although various example embodiments have been described in detail herein, those skilled in the art will readily appreciate in view of the present disclosure that many modifications are possible in the example embodiments without materially departing from the concepts of present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination. In addition, other embodiments of the present disclosure may also be devised which lie within the scopes of the disclosure and the appended claims. Each addition, deletion, and modification to the embodiments that falls within the meaning and scope of the claims is to be embraced by the claims.

Certain embodiments and features may have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges may appear in one or more claims below. Any numerical value is "about" or "approximately" the indicated value, and takes into account experimental error and variations that would be expected by a person having ordinary skill in the art.

The invention claimed is:

1. A system comprising:

at least one light-emitting element (LEE), said at least one LEE comprising at least three primary colors and having a light output, wherein said light output of said at least one LEE is driven or modulated by a signal for each of said at least three primary colors;

a processor configured to adjust said light output of said at least one LEE for each of said at least three primary colors to a first target light output; and a storage configured to store correction parameters that are configured to be used to adjust said light output of said at least one LEE for each of said at least three primary colors to said first target light output;

wherein the processor is further configured to perform a mathematical calculation to obtain one or more new correction parameters of a primary color set comprising said at least three primary colors, based on previous correction parameters and based on a second target light output, the second target light output being a new target light output that is different than the first target light output, and wherein the processor is further configured to implement the one or more new correction parameters and thereby modify said light output to said second target light output based on said mathematical calculation.

2. The system according to claim 1, wherein said mathematical calculation including determining one or more calibration matrices.

3. The system according to claim 1, wherein said at least three primary colors are Red (R), Green (G) and Blue (B).

4. The system according to claim 1, wherein said at least one LEE comprises a choice of Light Emitting Diodes (LEDs), Organic Light Emitting Diodes (OLEDs), or any other light emissive device.

5. The system according to claim 1, wherein said system is a lighting system.

6. The system according to claim 1, wherein said system is a light source display system having a white point.

7. The system according to claim 6, wherein the white point of said light source display system is based on said mathematical calculation.

8. The system according to claim 6, wherein said light source display system is configured to render visual content using said light output, said first target light output or said second target light output of said at least one LEE.

9. The system according to claim 1, wherein the at least one light-emitting element (LEE) includes an array of a plurality of light-emitting elements (LEEs).

10. The system according to claim 1, wherein said correction parameters include calibration data.

11. The system according to claim 1, wherein said processor is configured to adjust said light output of said at least one LEE independently or separately for each of said at least three primary colors to the first target light output and/or to the second target light output.

12. The system according to claim 1, wherein the mathematical calculation of the one or more new correction parameters includes calculating new calibration data.

13. The system according to claim 1, wherein the processor is configured to perform the mathematical calculation of the one or more new correction parameters based on said first target light output or desired light output of the primary color set comprising said at least three primary colors, based on the previous correction parameters, and/or based on the second target light output.

14. The system according to claim 1, wherein the processor includes a single processing unit or is a processing system including a plurality of processing units.

15. The system according to claim 1, further comprising a light-emitting display or lighting system comprising said at least one light-emitting element (LEE).

16. The system according to claim 15, wherein the light-emitting display or lighting system, the processor, and the storage are arranged within a same housing.

17. The system according to claim 15, comprising a plurality of light-emitting displays or lighting systems, each of the light-emitting displays or lighting systems comprising at least one light-emitting element (LEE), wherein the processor is a central processor for the plurality of light-emitting displays or lighting systems and is configured to adjust the light output of each of said at least one LEEs of each the plurality of light-emitting displays or lighting systems, and is further configured to perform said mathematical calculation of one or more new correction parameters for of said LEEs of each of the plurality of light-emitting displays or lighting systems.

18. A method for altering a light output of one or more light-emitting elements (LEEs) of a display system comprising said one or more LEEs, said one or more LEEs comprising at least three primary colors, said light output of said one or more LEEs being driven or modulated by a signal for each of said at least three primary colors, said method comprising:

measuring said light output for each of said one or more LEEs of said lighting system or said display system according to each of said at least three primary colors;

retrieving or calculating correction parameters that are configured to be used for to adjust said light output of at least one LEE for each of said at least three primary colors to said first target light output;

performing a mathematical calculation to obtain one or more new correction parameters of the primary color set comprising said at least three primary colors, based on previous correction parameters; and based on a second target light output, the second target light output being a new target light output that is different than the first target light output; and implementing the one or more new correction parameters to said light output of said LEEs and thereby modifying said light output to said second target light output based on said mathematical calculation.

19. The method according to claim 18, wherein said system is a light source display system having a white point, and said method herewith altering the white point of said light source display system.

20. The method according to claim 18, wherein said at least three primary colors (of said at least one LEE) are Red (R), Green (G) and Blue (B).

21. A hardware storage device having stored thereon computer-executable instructions which, when executed by one or more processors of a lighting system or a display system cause one or more processors to perform the method according to claim 18.

22. The method according to claim 18, wherein said performing the mathematical calculation includes determining one or more calibration matrices.

* * * * *